US006277475B1

(12) United States Patent
Hogarth et al.

(10) Patent No.: US 6,277,475 B1
(45) Date of Patent: Aug. 21, 2001

(54) INK TRANSFER RIBBON

(75) Inventors: Ian W. Hogarth; Robert Ivan Wilkinson; Derek Alexander McDonald, all of Aberdeenshire (GB)

(73) Assignee: Pelikan Produktions AG, Egg/ZH (CH)

( * ) Notice: Subject to any disclaimer, the term of this patent is extended or adjusted under 35 U.S.C. 154(b) by 0 days.

(21) Appl. No.: 09/051,187

(22) PCT Filed: Jul. 30, 1997

(86) PCT No.: PCT/EP97/04147

§ 371 Date: Jul. 13, 1998

§ 102(e) Date: Jul. 13, 1998

(87) PCT Pub. No.: WO98/05513

PCT Pub. Date: Feb. 12, 1998

(30) Foreign Application Priority Data

Aug. 7, 1996 (DE) ............................................ 196 31 889

(51) Int. Cl.[7] ..................................................... B32B 27/14

(52) U.S. Cl. .......................... 428/195; 428/409; 428/484

(58) Field of Search .................................... 428/195, 220, 428/323, 332, 333, 337, 913, 914, 409, 484

(56) References Cited

U.S. PATENT DOCUMENTS 4,675,233 6/1987 Nakahara et al. .
4,853,274 * 8/1989 Makishima et al. ................. 428/143
5,196,391 * 3/1993 Ohno et al. .......................... 503/200
5,837,382 * 11/1998 Hayashi et al. ...................... 428/484

FOREIGN PATENT DOCUMENTS 0 439 049 A1 7/1991 (EP) .
0 476 508 A1 3/1992 (EP) .
0 501 011 A1 9/1992 (EP) .
60-247584 12/1985 (JP) .
2-108592 * 4/1990 (JP) ................................ B41M/5/40

OTHER PUBLICATIONS

Patent Abstract of Japan, vol. 9, No. 25, M–355, Abstract of JP 59 169878 A (Pilot Pen K.K.) Sep. 25, 1984.
Patent Abstract of Japan, vol. 10, No. 163, M–487, Abstract of JP 61 016890 A (Fuji Xerox K.K.) Jan. 24, 1986.
Patent Abstract of Japan, vol. 13, No. 398, M–866, Abstract of JP 01 141089 A (Toppan Printing Co.) Jun. 2, 1989.

* cited by examiner

*Primary Examiner*—Bruce H. Hess
*Assistant Examiner*—Michael E. Grendzynski
(74) *Attorney, Agent, or Firm*—Fay, Sharpe, Fagan, Minnich & McKee, LLP

(57) ABSTRACT

An ink transfer band has (a) a microporous flexible substrate; (b) one or more optional intermediate layers; and (c) one or more layers of a transfer ink. The ink transfer ribbon is characterized in that the back side of the substrate has a surface roughness depth $R_t$ of at least approximately 400 nm and an average roughness value $R_a$ of at least approximately 40 nm. This transfer ribbon has the advantage of solving in a simple and economical manner the problems related to oil migration and static electricity.

13 Claims, 1 Drawing Sheet

INK TRANSFER RIBBON

Figure 1:
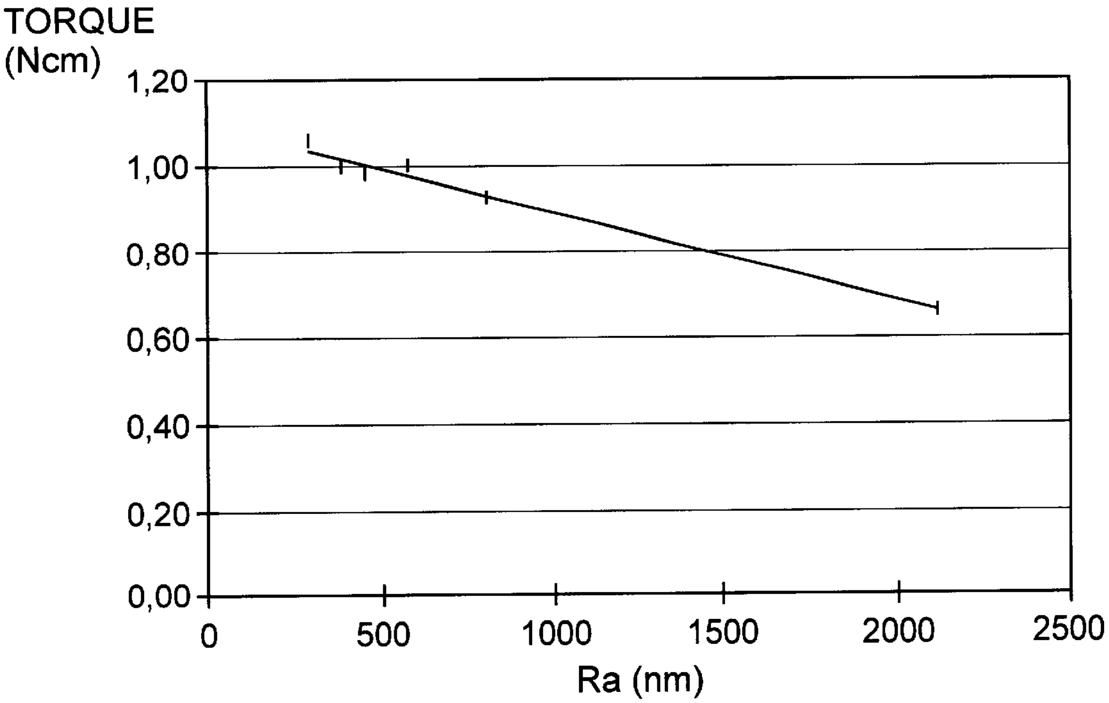

The present invention concerns a color transfer ribbon, which has (a) a flexible micro-porous carrier, (b) one or several intermediate layers and (c) one or several layers of a transfer color. Such color ribbons are used in key stroke printers and key stroke typewriters.

Transfer color ribbons which are employed in typewriters or similar printers, usually have a micro-porous carrier of plastic material, which is coated with a layer of a transfer color, which may, among others, contain oil and material which is transferred to paper during the printing action. The micro-porosity of the carrier is an important pre-requisite for sufficient anchoring of the color layer(s) on the carrier. With the aid of the transfer color ribbon, symbols are printed onto substrates, whereby the transferred symbols adhere either permanently to the substrate or can be removed with aid of an adhesive strip, which allows corrections. Such color ribbons are usually wound on spools fitted in color tape cassettes installed in key stroke typewriters or printers. The color ribbon cassettes permit simple installation of color ribbons in the machine.

Application of a transfer color layer on the carrier is usually done from a melt or from a solution in a solvent. U.S. Pat. No. 3,825,470 describes a correctable transfer color ribbon. U.S. Pat. No. 3,496,015 describes a so-called MICR ribbon (MICR=magnetic ink character recognition). The layer of the transfer color may have a spongy structure, whereby during key stroke, a small amount of color is extruded and transferred to the substrate. The layer of the transfer color can, alternatively, also be pictorially detached and holohedrally transferred.

The layer of the transfer color contains in general oils or oil-like modification substances, such as for example, fatty acid alkyl esters, which can migrate after application into the micro-porous carrier. This may lead to problems with respect to transfer color ribbons—specifically those of small width, during transport through the printer mechanism. If, for example, oil exits from the color ribbon to the transport mechanism, the presence of oil during the ribbon transport may result in higher traction resistance and even in sticking, so that the ribbon is no longer moved by the transport mechanism. Furthermore, the oil, when it gets on the drive wheel, can act as a lubricating agent and cause the ribbon to slip, so that the ribbon ceases to move.

As a further problem, the oil can accumulate in such volume on the drive wheel, that the transfer color ribbon will stick to it because of adhesion. In a rolled-up state on the supply spool, the front side of the ribbon comes, furthermore, in contact with the reverse side of the next loop and minor oil quantities may result in the sticking together of loops and increased unwind resistance. These problems are further intensified by the effect of heat.

Additional problems arise due to static electricity. In the color ribbon cassette and in the transport mechanism of the printer, the color ribbon is passed along stationary surfaces. Due to the build-up of friction electricity, the color ribbon may stick to these stationary surfaces, which leads to added stress on the printer motor. In traditional color ribbons, this problem is being faced in that the thermo-transfer color has a certain electrical conductivity in order to thus avoid the generation of static electricity. Naturally, this will restrict, to a significant extent, freedom in the formulation of the transfer color.

EP-A- 0 167 932 proposes a reverse-side layer, in order to combat the problems caused by oil migration through the carrier foil. The said reverse-side layer guarantees a clean friction surface and good contact with the drive device. The reverse-side layer may contain a polyester, a vinyl chloride resin or a polyurethane resin and also a silicic acid-holding filler. It is evident from disclosure of EP-A-0 167 932, that this reverse-side layer acts as barrier coating for the oil migration. An increase in the surface roughness is not addressed. Nor does the EP-A-0 167 932 deal with the problems relating to electrostatic electricity. Moreover, it is a drawback that a separate reverse-side layer must be applied onto the reverse side of the carrier in a separate production step.

U.S. Pat. No. 4 675 233 describes an ink transfer material for printers which has a bi-axially oriented polyester foil and a transfer ink layer, whereby the bi-axially oriented polyester foil has a thickness from 1 to 15 $\mu$m and the rough surface an average roughness value from 0.02 to 1 $\mu$m and a maximum height from 0.2 to 10 $\mu$m. Polyester foils, however, are not micro-porous and constitute a barrier coating or the oil migration. Therefore, polyester foils are unsuitable for use as carrier materials for color ribbons in key stroke printers and key-stroke typewriters.

Consequently, it was the object of the present invention to eliminate the described problems in connection with oil migration and static electricity in simple and economic fashion.

According to the invention, this object is solved by a color transfer ribbon which is characterized in that the reverse side of the carrier has a surface roughness with roughness depth $R_1$ of at least approximately 400 nm and a mean roughness value $R_a$ of at least approximately 40 nm.

The term "Roughness Depth $R_1$ " signifies the distance from the basic or reference profile of a surface profiled, in other words the maximum "hill-valley distance" between reference profile and actual profile, which is also called CLA (center line average), i.e., the arithmetical mean of the deviations of the profile from a center line.

The "hills" on the reverse side of the carrier prevent formation of a cohesive oil film which demonstrates unwelcome adhesive tendency vis-a-vis the adjacent loop or other surfaces. The "hills" act, moreover, as distance keepers and prevent full plane contact of the reverse side of the ribbon with other surfaces, which clearly reduces the friction resistance and wind-down resistance.

Traditional carrier foil for printer color ribbons are usually produced by means of extrusion of melt flow, whereby a slot nozzle serves as extruder, from which the melt drops onto a cooled extrusion base (drum or ribbon), or by extrusion into a water bath.

The foil properties, such as porosity, tensile strength and surface roughness greatly depend upon the crystallinity, the molecular weight distribution and the manufacturing conditions, and that is why selection of employable raw materials is highly restricted at the present time. Two suitable HDPE grades for carrier foils are for example M5395/1 by Lyondell and 6340/3 by Dupont. Surface roughness of these traditional carrier foils varies considerably, depending upon charge, the values for $R_t$ and $R_a$ however lie always clearly below 400 or 40 nm.

Figure 2:
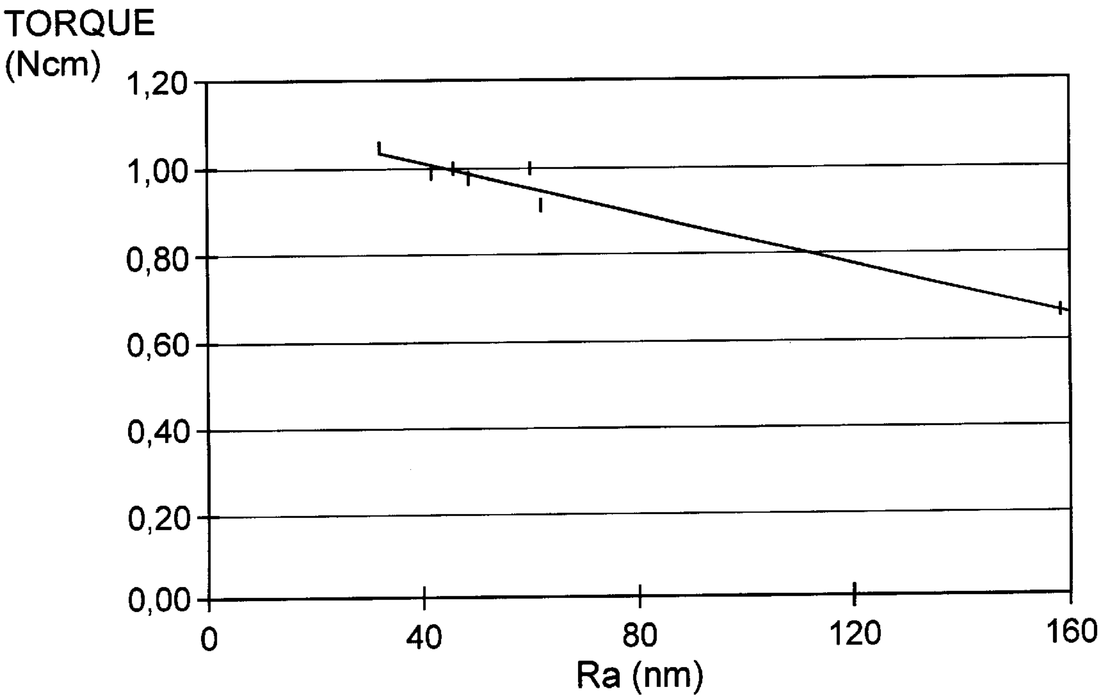

In preferred specific embodiments, $R_t$ ranges approximately from 400 to 5,000 nm and $R_a$ approximately 40 to 500 nm, specifically $R_t$ ranges approximately from 600 to 2,500 nm and $R_a$ approximately 70 to 250 nm. Most specifically preferred is $R_t$ of at least approximately 650 nm and $R_a$ of at least approximately 80 nm. The effect of differing roughness depths or of a differing mean roughness value of the carrier upon the drive torque of a color ribbon cassette is represented in the attached FIGS. 1 and 2. $R_t$ and $R_a$ were altered via variation of particle size and concentration of the filler of a color ribbon carrier, the manufacture of which is described below. It is clearly apparent that the required torque declines with rising $R_t$ or $R_a$.

For purposes of the invention $R_t$ or $R_a$ were ascertained by means of a Form-TALYSURF Series 2 Laser Instrument (from RANK TAYLOR HOBSON). Determination of roughness was done according to BS 1134.

The necessary surface roughness of the micro-porous carrier is preferably produced by employing a particle shaped filler substance, which is for example incorporated into the carrier foil during extrusion of the thermoplastic synthetic material. Examples of suitable filler materials are, among others, calcium carbonate, diatomaceious earth, clay, glass, hollow glass particles, aluminum silicates, gypsum, magnesium carbonate, talcum, calcite, fibers, calcium mica, amorphous silicic acid, other silicates, etc. A particularly preferred filler is micronized PTFE, which is available, for example from Micro Powders Inc., U.S.A. under the name FLUO HTG. It has a softening point of more than 316° C. and is retained as particles in the melted thermoplastic material at approximately 260° C. The filler will preferably have a relatively low abrasivity so that the extrusion nozzle will not be exposed to excessive wear and tear. The filler should, in addition, be stable at the melting temperature of the thermoplastic material of the carrier foil, Suitable as thermoplastic material for the carrier foil are thermoplastic substances which are micro-porous in thin layer. Among these, polyolefins are preferred, specifically polyethylene (HDPE, LDPE, LLDPE) and polypropylene, ethylene-propylene-propolymer and also mixtures of these materials.

If, according to this preferred specific embodiment, a particle-shaped filter is included, then the quality of the starter material of the foil and the precise manufacturing conditions of the foil do not play a critical role. The foil can be produced by any arbitrary method, for example by melt-extrusion onto a cooled drum, melt-extrusion into a water bath, extrusion with subsequent stretching or blowing. Typical melting temperatures for polyethylene are approximately 80 to 150° C., specifically approximately 105 to 140° C. The cooled drum is customarily held at a temperature from 10 to 35° C. or the water bath at a temperature from 50 to 70° C.

Preferably, a certain particle size distribution is observed relative to the filler material. Average particle size of the filler lies preferably between approximately 0.5 and 15 $\mu$m, specifically between approximately 2 and 8 $\mu$m. With smaller particle sizes, the desired optimum effect if not attained. Application concentration lies preferably between 500 and 100,000 ppm, specifically between 100 and 10,000 ppm. The carrier foil is preferably extruded in a thickness of approximately 6 to 30 $\mu$m, specifically in a thickness of approximately 8 to 16 $\mu$m.

Preferably no additional layer(s) is/are arranged on the reverse side of the carrier.

Preferred color transfer ribbons have a minimum of one transfer color layer, which contains approximately 10 to 35% by weight of a binder substance, specifically in the form of a polyamide resin, approximately 30 to 55% by weight of mineral oil and/or fatty acid ester and approximately 25 to 35% by weight of a color substance, selected from among pigments and in the remaining ink particles, insoluble organic dyes. The transfer color layer may in addition contain waxes, specifically synthetic waxes. The formulation of the transfer color layer is deposited in dissolved/dispersed form in a volatile solvent on the carrier. A suitable solvent is a mixture of isopropyl alcohol and toluol. The solvent is subsequently evaporated, for example by passing heated air over it.

The color transfer ribbon has many benefits:

(1) it reduces the detrimental effects of static load build-up in the ribbon and thus permits greater flexibility in the formulation of the layer of the transfer color, whereby observances of a given electrical conductivity of the coating is less stringent, (2) it reduces or eliminates the possibility of ribbon blockage on smooth surfaces;

(3) it reduces contact between color ribbon and cassette parts and thus facilitates savings of building components when manufacturing the cassettes. Specifically, reversing rollers can be removed from the cassette, which reduces the manufacturing costs significantly;

(4) it is less dependent upon quality fluctuations of the synthetic granulate which is used in the manufacture of the carrier material;

(5) the torque which is needed for transport of the color ribbon is lower, which permits the use of cheaper drive motors on the part of the printer manufacturers.

The invention is explained in more detail based on the following examples:

EXAMPLE 1

This example explains the manufacture of a carrier for a transfer color ribbon according to the invention, made of polyethylene/filler.

HDPE-granulate (Grade M 5395/1 by Lyondell) was extruded with 5,000 ppm calcium carbonate (Snowcal 40 by Croxton & Garry) into a foil having a thickness of 12 $\mu$m. During the extrusion process, the filler was added to the main flow of HDPE, as separately prepared concentrate (20% filler in HDPE) with concentration of 2.5%. The obtained foil indicated the following roughness values: $R_t$=630 nm, $R_a$=80 nm.

EXAMPLE 2

This example explains the manufacture of a carrier of a transfer color ribbon according to the invention made of propylene/filler.

Propylene granulate (Hostelen PPU 1080 F by Hoechst, Germany) was extruded with 6,000 ppm silicic acid (Tamsil 10, particle size 0.4 to 6 $\mu$m by Lawrence Industries) to a foil with a thickness of 12 $\mu$m. The filler was again added as separately prepared concentrate (15% filler material in LLDPE) in a concentration of 4%. The obtained foil had the following roughness values: $R_1$=698 nm, $R_a$=87 nm.

EXAMPLE 3

The carrier foils which were obtained in the above examples were coated with a coating mass according to recipe A (correctable ink) or B (MICR ink) and the solvent was evaporated.

| | % by Weight |
|---|---|
| Recipe A | |
| Polyamide (1533 from Union Camp) | 6 |
| Mineral Oil/Fatty Acid Ester (Butylstearate, Croda Chemicals) | 8 |

-continued

| | % by Weight |
|---|---|
| Carbon Black (Mogul L, Cabot) | 6 |
| isopropyl alcohol | 60 |
| Toluol | 20 |
| Recipe B | |
| Polyamide (Eurelon 960, Scherring Chemicals) | 5.6 |
| Fatty Acid Ester Mixture (Glyceryltrioleat, Croda Chemicals) | 6.9 |
| Carbon Black | 1.4 |
| Magnetic Black (iron oxide B350, Magnox) | 21.0 |
| Toluol | 32.0 |
| Isopropyl Alcohol | 33.1 |

The obtained transfer color ribbons showed outstanding print behavior and operated with minimum expenditure of energy in color ribbon cassettes.

What is claimed is:

1. Color transfer ribbon, comprising (a) a micro-porous flexible carrier, (b) optionally one or several intermediary layers and (c) one or several layers of a transfer color characterized in that the flexible carrier is polyolefin, no other layer is arranged on the reverse side of the carrier, and the reverse side of the carrier has a surface roughness with roughness depth $R_t$ of at least approximately 400 nm and an average roughness value $R_a$ of at least approximately 40 nm.

2. Color transfer ribbon according to claim 1, characterized in that the reverse side of the carrier has a roughness depth $R_t$ of approximately 600 to 2,500 nm and an average roughness value of $R_a$ of approximately 70 to 250 nm.

3. Color transfer ribbon according to claim 1, characterized in that the carrier comprises a thermoplastic material with particle-shaped filler.

4. Color transfer ribbon according to claim 3, characterized in that the average particle size of the filler substance ranges between approximately 0.5 and 15 μm.

5. Color transfer ribbon according to claim 3, characterized in that the concentration of the particle-shaped filler substance in the synthetic material is between approximately 500 and 100,000 ppm.

6. Color transfer ribbon according to claim 1, characterized in that the carrier has a thickness of approximately 6 to 30 μm.

7. Color transfer ribbon according to claim 1, characterized in that it has a minimum of one transfer color layer, which contains approximately 10 to 35% by weight of a binder, specifically in form of a polyamide resin, approximately 30 to 55% by weight of mineral oil and/or fatty acid ester and approximately 25 to 35% by weight of a color substance, selected from pigments, and insoluble organic dyes in the remaining ink constituents.

8. Color transfer ribbon according to claim 2, characterized in that the carrier comprises a thermoplastic material with particle-shaped filler.

9. Color transfer ribbon according to claim 4, characterized in that the concentration of the particle-shaped filler substance in the synthetic material is between approximately 500 and 100,000 ppm.

10. Color transfer ribbon according to claim 4, characterized in that the thermoplastic synthetic material is polyolefin.

11. Color transfer ribbon according to claims 5, characterized in that the thermoplastic synthetic material is polyolefin.

12. Color transfer ribbon according to claim 6, characterized in that the carrier has a thickness of approximately 8 to 16 μm.

13. Color transfer ribbon according to claim 3, characterized in that it has a minimum of one transfer color layer, which contains approximately 10 to 35% by weight of a binder, specifically in form of a polyamide resin, approximately 30 to 55% by weight of mineral oil and/or fatty acid ester and approximately 25 to 35% by weight of a color substance, selected from pigments, and insoluble organic dyes in the remaining ink constituents.

* * * * *